Aug. 23, 1960 F. S. GLAZA 2,950,402
MOTOR WINDING CENTRIFUGAL CONTAMINATION ELIMINATOR
Filed Nov. 22, 1957
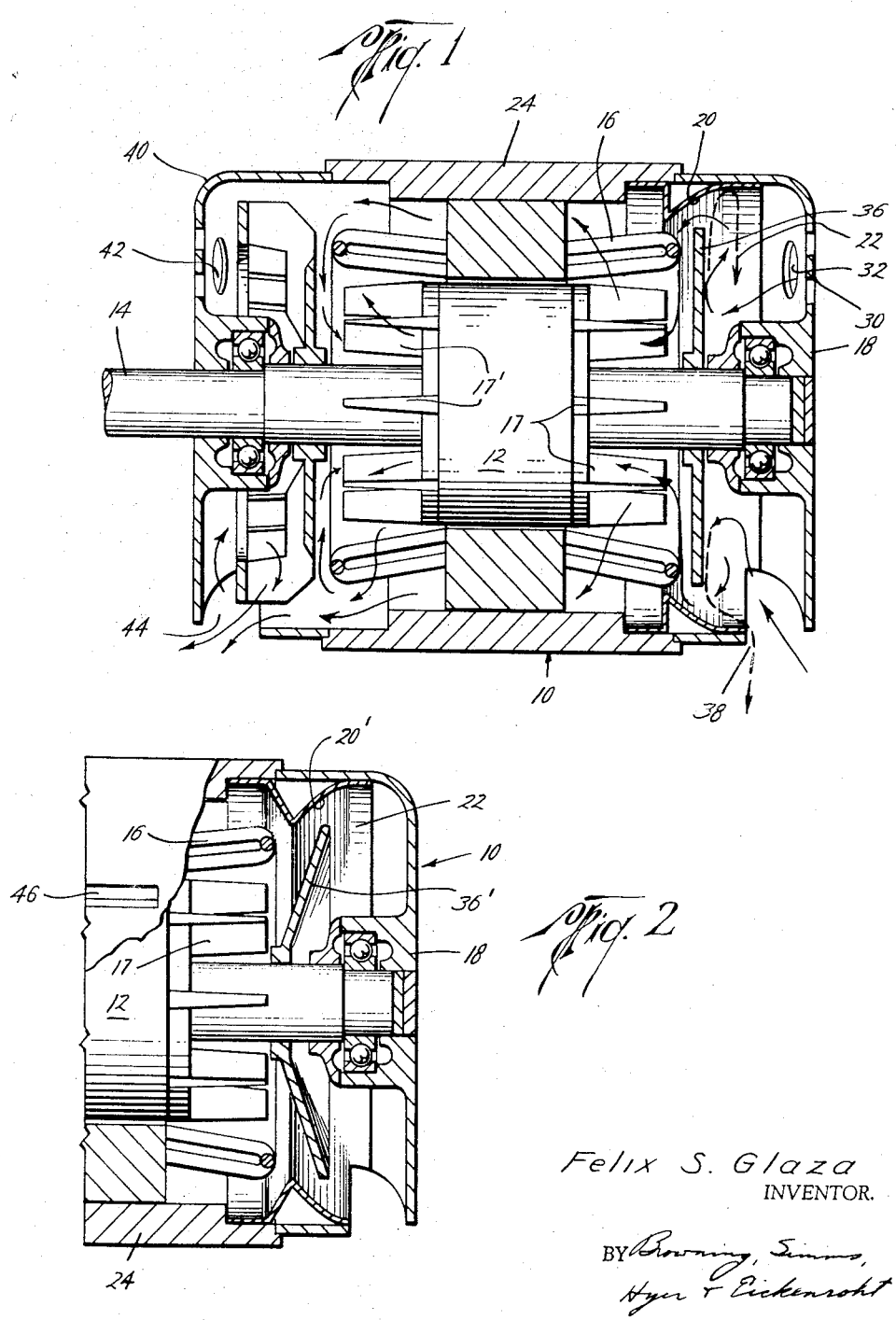
Felix S. Glaza
INVENTOR.
BY
ATTORNEYS

2,950,402
MOTOR WINDING CENTRIFUGAL CONTAMINATION ELIMINATOR

Felix S. Glaza, 1522 W. Broad St., Freeport, Tex.

Filed Nov. 22, 1957, Ser. No. 698,235

2 Claims. (Cl. 310—56)

The present invention relates to a device and method for ventilating electric motors or generators and more particularly has reference to all motors classified in the industry as open, splash-proof, drip-proof, weather protected, and in the instance of the textile art, self-cleaning, in which ventilating cool air passes within and through and impinges upon the rotor, armature, field windings, poles and other related elements interior of the motor or generator casing.

In this specification the term "high inertia particles" is used to designate moisture or the like, lint in the case of textile machines, abrasive particles from sanding machines, emery wheels, milling machines or the like, and chemicals having a substantially heavy molecule compared with a molecule of nitrogen, oxygen or carbon dioxide, that have a deleterious effect upon any of the internal elements of a motor or tend to clog it and prevent adequate cooling or proper operation. The term "low inertia air" is used to specify any air absent of these high inertia contaminating particles. While the purpose of low inertia air, being substantially pure air, is to cool the motor as it is induced or forced through the motor, it is found that such air having high inertia particles tends to and does, after a period of time, significantly less than the life of the motor, contaminate and react with the internal material of the motor so that part of, or the entire motor, must be cleaned and in many cases replaced.

An object of this invention, accordingly, is to provide an apparatus and a method for eliminating the effects of the high inertia contaminating particles while yet utilizing low inertia air for purposes of cooling, even though the motor is located in air including such particles.

Prior art devices for keeping out contamination such as dust, dirt, smoke, certain chemicals, or moisture have included stationary baffles, air filters, ventilation slots uniquely positioned about the motor, etc., but provided no adequate solution.

The apparatus and method of this invention effectively cools the motor with clean air even though located in air contaminated with high inertia particles. Generally, it provides the cooling system with a centrifugal element which may comprise a disc-shaped, or other geometrically shaped slinger or centrifugal decontaminating element located in the entrance of the air passage to the motor, and mounted on the motor shaft or otherwise suitably driven.

The invention also contemplates a motor having a slinger or centrifugal decontaminating element at each end of the motor frame thereof where the air enters. In such motors, after the passage of the decontaminated air over the stator winding and rotor, etc., it is ordinarily discharged at the center of the motor frame.

Other objects, advantages and features of the invention will be apparent from the following detailed description and the accompanying drawing of exemplary embodiments of the invention, in which similar characters of reference indicate similar parts throughout the several views.

In the drawing:

Fig. 1 illustrates a longitudinal sectional view of one type of electric motor embodying this invention, with certain interior parts shown in elevation; and Fig. 2 illustrates a side view, partly in cross-section and partly in elevation, of one end of another type of electric motor embodying this invention.

Referring now more in detail to the drawing, a motor 10 is shown having a rotor 12 mounted on a shaft 14, stator windings 16 mounted internally of the frame of the motor 10, and a shield or end 18 for the motor through which is mounted the shaft on conventional type ball bearings having an oil seal. Air impellers 17 and 17' are provided on the rotor for inducing a flow of air through the motor. The motor as thus far described is conventional.

In accordance with this invention, a stationary baffle 20 is provided. It is annular and of an axial extent from adjacent the plane of the outboard ends of the impellers 17 to a plane adjacent the entrance of air to the end shield 18. It is of a diameter adjacent the impellers just sufficient to clear the windings 16, and flares to a larger diameter at its outer end substantially the same as the inner diameter of the end shield 18. It may be secured in any desired manner to the center frame 24 of the motor, or to the end 18, as by projection, spot, or resistance welding. The mounting of the end 18 on the frame 24 is likewise accomplished in any well-known manner desired.

In the end face of end shield 18 are shown openings 32 and in the bottom an opening 38 for the entry of air as shown by solid arrows. Within the end shield and in the path of induced air flow through openings 32 and 38 is a centrifugal element or slinger 36. The slinger 36 is shown as a disc mounted fast upon the shaft 14 so that it rotates therewith. It is positioned within and somewhat upstream from the smaller end of deflector or baffle 20. As the slinger and shaft rotate and the air stream containing high inertia particles impinges thereon, such particles will characteristically be thrown by centrifugal force into the peripheral portions of the chamber where they are intercepted by and collect upon deflector or baffle 20 and flow therealong downwardly and toward the larger end thereof until they are eliminated through opening 38. This flow of the particles is shown by dotted arrows.

The now low inertia relatively purified air flows around the slinger and into the central part of the rotor whence part of it is thrown outward toward and through the stator windings 16 and then through the stator to the opposite end of the motor while part flows through the rotor endwise and thrown radially outwardly by the vanes 17' at the opposite end of the rotor as shown by solid arrows. Additional circulating vanes may be employed on the shaft as shown if desired to achieve the desired circulation of air within the motor. The air exhausts through suitable openings in end shield 40 as shown at 42 and 44.

The slinger in Fig. 1 is distinctive in that it is illustrated as being disc-shaped in nature. In the embodiment of the invention shown in Fig. 2 there is provided a cone-shaped slinger 36'. The baffle 20' is also of slightly different shape from baffle 20.

However, in Fig. 2 the motor illustrated is of the type which takes in air at the ends and exhausts it through openings 46 adjacent the central part of the motor frame. Only one end of this motor is shown but it will be understood that the opposite end will be a mirror image of the end shown, the particle eliminating arrangement of this invention being duplicated at each end so as to decontaminate all air taken in.

It will be understood that this invention is not limited to the specific types of motors illustrated but is applicable to all motors in which ventilating cooling air enters in a stream which could be made to impinge, before entering the stator or rotor, upon a disc or slinger rotating with the rotor and positioned to sling high inertia particles against a barrier or deflector which will lead them away from the air stream. Such motors are now classified in the industry by various designations such as "open," "splash-proof," "drip-proof," "weather-protected," "self-cleaning," etc. It is also adaptable to many types of motors without changes in motor design and may be added to many presently conventional types in the field without major alteration thereof.

It will be understood that while the slinger and baffle are shown adjacent the ventilating fan on the rotor, this position is not critical as any position is suitable where the slinger would intercept the stream of entering air and throw the higher inertia particles therefrom outward against the baffle while the lower inertia relatively pure air crosses their trajectory into the interior of the motor. The degree of overlap of slinger and baffle may be varied to suit circumstances.

It will also be clear that the slinger may be mounted independently on the motor shaft as shown or in any other manner mounted to rotate with the rotor.

Any type of rotor fan blades may be employed with this invention so long as they are capable of causing an air flow which will impinge on a slinger mounted as herein taught.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth (or shown in the accompanying drawing) is to be interpreted as illustrative and not in a limiting sense.

The invention having been described, what is claimed is:

1. In a motor of the type comprising an enclosed stator, having a cooling air inlet adjacent one end and an outlet remote therefrom, a rotor rotatably mounted within the stator, and means for causing a flow of cooling air in through said inlet, through the motor and out through said outlet, the improvement which comprises a slinger secured to said rotor to rotate therewith and having a projection-free, dished concave surface transverse to the axis of the rotor located in the path of the stream of air entering said inlet whereby higher inertia particles contained in said entering air will be thrown radially outwardly and tend to have a component of motion opposite to that of the flow of air against the transverse surface and the lower inertia air allowed to continue its flow into the motor interior, and means for catching said particles and restraining them from further flow with said air stream.

2. In a motor of the type comprising an enclosed stator, having a cooling air inlet adjacent one end and an outlet remote therefrom, a rotor rotatably mounted within the stator, and means for causing a flow of cooling air in through said inlet, through the motor and out through said outlet, the improvement which comprises a slinger secured to said rotor to rotate therewith and having a projection-free surface transverse to the axis of the rotor located in the path of a stream of air entering said inlet whereby higher inertia particles contained in said entering air will be thrown radially outwardly and the lower inertia air allowed to continue its flow into the motor interior, and an annular baffle surrounding said slinger and spaced therefrom and having its interior flared from a smaller diameter on the downstream side of said slinger to a larger diameter on the upstream side of said slinger.

References Cited in the file of this patent

UNITED STATES PATENTS

| | | |
|---|---|---|
| 1,915,449 | Sacrey | June 27, 1933 |
| 1,963,398 | Blair | June 19, 1934 |
| 1,963,401 | Clason | June 19, 1934 |
| 2,003,000 | Kelpe | May 28, 1935 |
| 2,769,934 | Stone | Nov. 6, 1956 |

FOREIGN PATENTS

| | | |
|---|---|---|
| 57,665 | Netherlands | June 15, 1946 |
| 482,136 | Germany | Sept. 7, 1929 |